No. 733,176. PATENTED JULY 7, 1903.
G. W. EVANS.
MILK WAGON.
APPLICATION FILED APR. 25, 1903.
NO MODEL. 2 SHEETS—SHEET 1.

Witnesses.
H. F. Meyer Jr.
G. F. Vogt.

Inventor.
George W. Evans
By Mann & Co,
Attorneys.

No. 733,176. PATENTED JULY 7, 1903.
G. W. EVANS.
MILK WAGON.
APPLICATION FILED APR. 25, 1903.
NO MODEL. 2 SHEETS—SHEET 2.
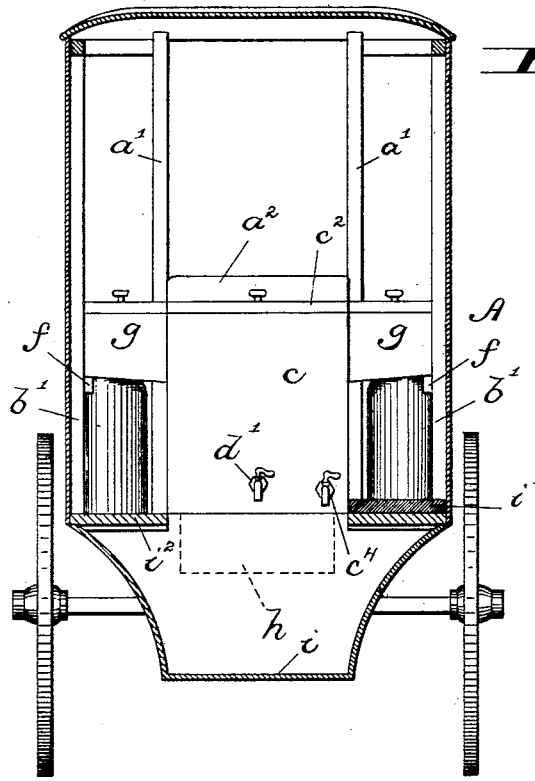
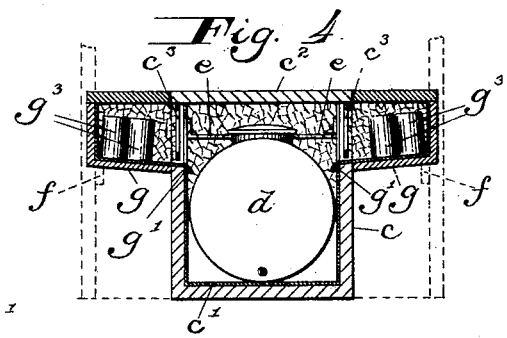
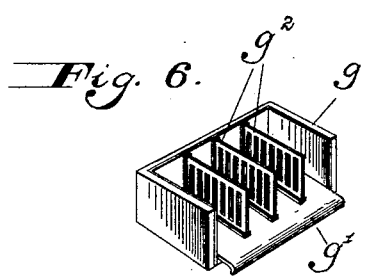
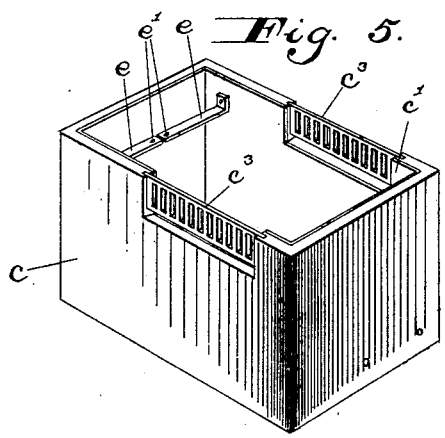
Witnesses.
Inventor.
George W. Evans
By Mann & Co,
Attorneys.

No. 733,176. Patented July 7, 1903.

UNITED STATES PATENT OFFICE.

GEORGE W. EVANS, OF COLDSPRING, MARYLAND.

MILK-WAGON.

SPECIFICATION forming part of Letters Patent No. 733,176, dated July 7, 1903.

Application filed April 25, 1903. Serial No. 154,221. (No model.)

*To all whom it may concern:*

Be it known that I, GEORGE W. EVANS, a citizen of the United States, residing at Coldspring, in the county of Baltimore and State of Maryland, have invented certain new and useful Improvements in Milk-Wagons, of which the following is a specification.

This invention relates to improvements in milk-wagon from which milk is distributed to various customers; and its object is to provide an improved construction of milk-wagon which will be hygienic and keep the milk in good condition and from which the milk can be conveniently served, as will be hereinafter more fully described and claimed, reference being had to the accompanying drawings, in which—

Figure 1:
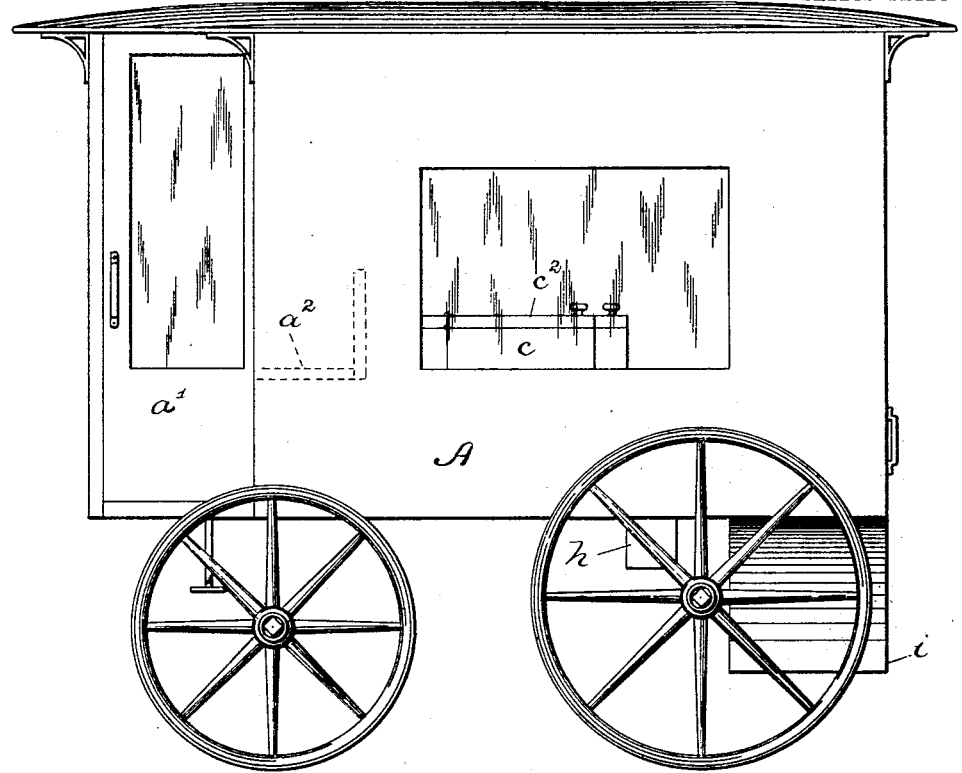
Figure 2:
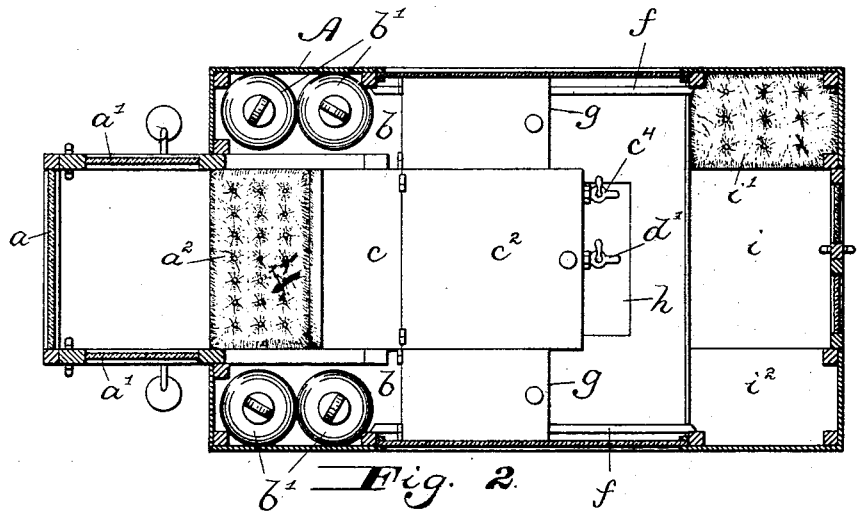

Figure 1 is a side elevation of my improved milk-wagon. Fig. 2 is a horizontal section thereof. Fig. 3 is a vertical transverse section. Fig. 4 is a detail transverse section taken through the milk and cream boxes. Fig. 5 is a detail perspective view of the milk-box. Fig. 6 is a similar view of one of the cream-boxes.

The body A of the wagon is provided with a storm-front consisting of a glass front panel $a$ and horizontally-sliding glass doors $a'$ at the side, and in the rear of said storm-front is a seat $a^2$ for the driver. The said body A is wider than the storm-front and is provided on each side of the driver's seat $a^2$ with a storage-compartment $b$, designed to receive milk or cream cans $b'$ to replenish the milk and cream boxes should the contents of the latter become exhausted while the wagon is out on a trip.

Preferably in the center of the wagon-body is located a milk-box $c$, which is metal-lined, as indicated at $c'$, Fig. 4, and which is intended to receive a milk-dispensing receptacle $d$, provided with a spigot $d'$ and kept from rolling in the box $c$ in any suitable manner, such as by braces $e$, having rivet-holes $e'$ to receive rivets for fastening the braces rigidly to the receptacle. The milk-box $c$ is further provided with a hinged lid or cover $c^2$, and at each side said box has a grating $c^3$, as illustrated in Figs. 4 and 5.

Ledges $f$ are arranged horizontally in the wagon-body A along two opposite sides of the latter. Two cream-boxes $g$ are employed in the wagon-body, one being on one side and the other on the opposite side of the central milk-box $c$, and on each of said ledges $f$ rests the outer side of a cream-box $g$. The inner side of each cream-box which adjoins the milk-box is open, as illustrated in Fig. 6, said opening registering with the grating $c^3$ in the milk-box, the bottom of said cream-box being provided with a projecting down-hooked flange $g'$, which takes over the top edge of the adjacent side of the milk-box $c$ underneath the grating $c^3$, as shown in Fig. 4, whereby each cream-box $g$ is supported detachably by said flange and one ledge $f$ at the corresponding side of the milk-box. The milk-box $c$ and the two cream-boxes $g$ fill and occupy the entire width of the wagon-body. Each of the cream-boxes $g$ is preferably provided with grated partitions $g^2$, which form it into a plurality of compartments intended to receive cream cans or bottles $g^3$, as illustrated in Fig. 4. The milk-box $c$ and the two cream-boxes $g$ are also intended to contain ice to keep the milk and cream cool and in good condition, and the ice drippings from each of the cream-boxes $g$ will flow through gratings $c^3$ into the milk-box $c$ and assist in keeping the milk-receptacle $d$ in the latter cool. The milk-box $c$ is provided with a drain-cock $c^4$, through which the water from the melted ice may be drawn off. The spigot $d'$ for the milk and the drain-cock $c^4$ are both located above a tank $h$, depressed in the bottom of the wagon-body, said tank being intended also to receive pint cups, quart cups, and the like.

At its rear the wagon-body A is provided with a depending or "drop" floor $i$, at one side of which is a raised seat $i'$ for an attendant and at the other side of which is a compartment $i^2$ for bottles or jars or for any other desired purpose.

The construction here shown and described of milk-box, cream-boxes, and storage-compartments insures a large proportion of the load to be well forward in the wagon-body, which is much to be desired, and also insures when an attendant is seated in the rear an equal distribution of the load relative to the whole wagon-body frame.

With my improved milk-wagon two persons are in attendance—one to drive and who is not required to leave the driver's seat $a^2$ and another to occupy the rear seat $i'$, who is to dispense the milk and cream to the customers.

Having thus fully described my invention, what I claim as new, and desire to secure by Letters Patent, is—

1. A milk-delivery wagon comprising a body having a central storm-front which is narrower than the body; a driver's seat at the rear of said storm-front, a storage-compartment at each side of the driver's seat and horizontal ledges along opposite sides of the body in the rear of said storage-compartment; a centrally-located milk-box provided on opposite sides with openings; a cream-box on each side of said milk-box and partially supported at the rear on said horizontal ledges, and at the front side cream-boxes being supported by said milk-box; a rear seat at the side of said body and a compartment also at the rear of the body opposite said rear seat.

2. A milk-wagon provided with a centrally-located milk-box having grated openings on two opposite sides; and a cream-box on each side of said milk-box and provided with a projecting down-hooked bottom flange taking over the top edge of the milk-box underneath the adjacent grating, as and for the purpose set forth.

3. A milk-wagon whose body is provided along opposite inner side walls with ledges, $f$, a centrally-located milk-box provided on two opposite sides with grated openings; and a cream-box on each side of said milk-box and partially resting on said ledges and each cream-box having an open side adjacent said milk-box and provided at such side with a down-hooked flange engaging said milk-box, as and for the purpose set forth.

In testimony whereof I affix my signature in the presence of two witnesses.

GEORGE W. EVANS.

Witnesses:
CHARLES B. MANN, Jr.,
G. FERDINAND VOGT.